United States Patent [19]

Albert

[11] 4,140,321
[45] Feb. 20, 1979

[54] PHONOGRAPH CARTRIDGE REPLACEABLE STYLUS ASSEMBLY

[75] Inventor: Neil F. Albert, Riverdale, N.Y.

[73] Assignee: Pickering & Company, Inc., Plainview, N.Y.

[21] Appl. No.: 893,465

[22] Filed: Apr. 4, 1978

[51] Int. Cl.² .................. G11B 3/02; H04R 11/12
[52] U.S. Cl. ...................... 274/37; 179/100.41 K; 179/100.41 M; 179/100.41 Z
[58] Field of Search ............ 179/100.41 M, 100.41 K, 179/100.41 Z; 274/37

[56] References Cited

U.S. PATENT DOCUMENTS

| | | | |
|---|---|---|---|
| 3,641,284 | 2/1972 | Westerkamp et al. | 274/37 |
| 3,924,076 | 12/1975 | Dubois | 179/100.41 M |
| 3,964,751 | 6/1976 | Vitale | 179/100.41 M |
| 4,009,885 | 3/1977 | Pritchard | 274/37 |
| 4,054,758 | 10/1977 | Fidi | 179/100.41 M |

*Primary Examiner*—Richard E. Aegerter
*Assistant Examiner*—John W. Shepperd
*Attorney, Agent, or Firm*—Kane, Dalsimer, Kane, Sullivan and Kurucz

[57] ABSTRACT

A phonograph cartridge replaceable stylus assembly is provided. The assembly comprises a housing having a nonmagnetic tube affixed thereto. The tube has a forward end and a rear end extending outwardly away from the housing. A nonmagnetic stylus arm extends through the tube forward end. A jeweled stylus is mounted to the front of the arm. The rear end of the arm passes through an elastomeric damper positioned within the tube. The damper serves as a universal pivot joint for the arm. The damper comprises a cylindrical member having a forward edge and a rear edge. The tube is crimped along a circular crimp line engaging the damper intermediate the forward and rear edges with the portions of the damper that do not engage the crimp also being free of the tube. A magnetic member is positioned within the tube secured to the arm and adapted to move therewith in response to motion of the jeweled stylus and following the grooves of a record. The arm passes through and extends beyond the magnetic member terminating within the elastomeric damper in front of the crimp. A tension-free tie wire extends rearwardly from the rear of the arm and is secured to the tube. The tie wire serves to restore the arm and hence the magnetic member to its zero position.

5 Claims, 2 Drawing Figures

PHONOGRAPH CARTRIDGE REPLACEABLE STYLUS ASSEMBLY

BACKGROUND OF THE INVENTION

The present invention relates to phonograph cartridges and more particularly to a replaceable stylus assembly for use in phonograph cartridges.

Phonograph pickup cartridges are generally either of the magnetic or ceramic type. Magnetic cartridges have recognized advantages in fidelity and response characteristics over ceramic cartridges and are widely used in quality high fidelity and stereophonic equipment.

In a magnetic cartridge, a jeweled stylus is used to track the grooves of a record disc. The stylus has attached to it a magnetic member which moves with the stylus within a magnetic circuit. The circuit includes portions about which a voltage generating coil is mounted so that flux variations in the circuit resulting from movement of the magnetic member are reflected in voltage changes at the output of the coils.

Heretofore, magnetic cartridges have been classified as being of either the moving magnet, moving iron type, or moving coil type. In the former, typified by U.S. Pat. No. 3,297,831, a permanent magnet moves directly with the jeweled stylus. The latter construction is typified by U.S. Pat. No. 3,546,399 wherein a tubular armature of permeable material moves with the stylus. The armature is magnetically coupled to a fixed permanent magnet which thus serves as the flux source to the magnetic circuit through the armature. In either case, it is important that the magnetic member (i.e., permanent magnet in the first type of cartridge or permeable armature in the latter cartridge) move in faithful correspondence to the jeweled stylus.

Heretofore, it was common practice to support the armature within an elastomeric grommet which in turn was supported within a nonmagnetic tube. To support the grommet in position, the non-magnetic tube was crimped over the grommet for substantially the entire length of the grommet. Ideally, the elastomeric grommet was to act as a universal joint for the armature. However, because of the nature of the support of the grommet within the non-magnetic tube, the joint was not truly a universal joint and the mechanical impedance of the system was unduly high thus adversely affecting low and mid frequency responses of such prior art devices.

In U.S. Pat. No. 3,964,751, there is disclosed a stylus assembly which seeks to alleviate the above problem by having the grommet engage the non-magnetic tube along an edge. This is accomplished in accordance with the patent by tapering the tube inwardly toward the rear and positioning the grommet so that its rear edge would engage the tapered tube wall. While the results obtained with this assembly were superior to alternate constructions then available, true tracking of the record groove information was not entirely obtained.

It was observed that the stylus assembly disclosed in U.S. Pat. No. 3,964,751 did not respond in the same manner at all frequencies. In wedging the grommet into the tapered tube, the tube walls unavoidably compress portions of the grommet, thereby causing it to act as a spring. The mechanical hysteresis introduced into the system as a result of the spring action of the grommet affected the return action of the stylus differently at different frequencies and amplitudes.

In an ideal stylus, the return action (i.e., the force which tends to return the stylus to its zero position after the stylus has been displaced in response to an undulation in a record groove) should be independent of the damping function of the armature support grommet.

In view of the above, it is the principal object of the present invention to provide an improved phonograph stylus assembly wherein the mechanical parameters for compliance and damping are separated. Compliance is controlled by a tension-free tie wire which serves only to return the stylus to its zero position after displacement. Damping is controlled by an elastomeric grommet which damps out unwanted resonant vibrations.

SUMMARY OF THE INVENTION

The above and other beneficial objects and advantages are attained in accordance with the present invention by providing an improved phonograph cartridge stylus assembly comprising a housing having a nonmagnetic tube affixed thereto. The tube has a forward end and a rear end extending outwardly away from the housing. A non-magnetic stylus arm extends through the tube forward end. A jeweled stylus is mounted to the front of the arm. The rear end of the arm extends into an elastomeric damper positioned within the tube. The damper serves as a universal pivot point for the arm. The damper comprises an elongated member having a forward edge and a rear edge. The tube is crimped along a circular crimp line engaging the damper intermediate the forward and rear edges with the portion of the damper forward of the crimp line being free of the tube. The arm passes through and extends beyond the magnetic member terminating within the damper in front of the crimp. A tension-free wire extends rearwardly from the rear of the arm and is secured to the tube. The tie wire serves to restore the magnetic member to its zero position and hence return the jeweled stylus to its zero position.

The present suspension serves to reduce the mechanical impedance of the stylus at the tip while still providing sufficient damping to supress resonance of the magnet. It accomplishes this in the following manner: The stylus tip moves in response to the record groove undulations. The damper is free to rock in its tapered socket, keeping the mechanical resistance low. The principal mode of resonance of the stylus is one where the magnet is oscillating about its center of mass. For this condition, the portion of the tube extending behind the magnet encounters substantial resistance in its effort to move laterally in the damper instead of pushing about the knife edge in response to input signals. This oscillation of the magnet also induces compression of the damper by the magnet also suppressing resonance of the magnet. The suspension thus has the desired (lower) mechanical impedance for wanted signals, but shows a very high mechanical impedance to unwanted resonances.

DETAILED DESCRIPTION OF THE PREFERRED EMBODIMENT

Figure 1:
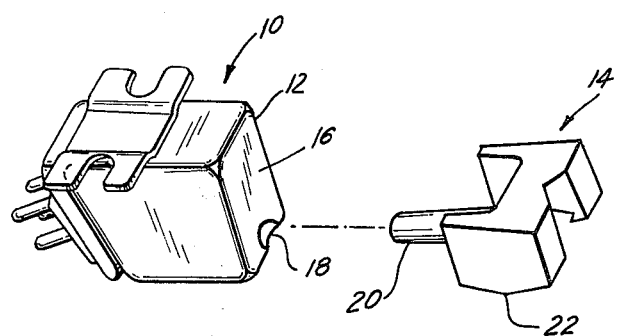
FIG. 1 is a perspective view of a magnetic phonograph cartridge.

Reference is now made to the associated drawings wherein the present invention is depicted. In FIG. 1 phonograph cartridge 10 is shown. Cartridge 10 comprises a cartridge body 12 and a removable replaceable moving system in the form of stylus assembly 14. Cartridge body 12 contains therein a transducer system which responds electrically and magnetically to the motion of the stylus assembly magnetic member to produce a monophonic, stereophonic or quadraphonic output. The details of the trandsducer system are immaterial for purposes of the present invention. Suffice it to say, the circuit may be of the type typified in either of the previously referred to U.S. Pat. Nos. 3,297,831 and 3,546,399 or a comparable circuit.

The forward face 16 of the cartridge body contains an opening 18 therein adapted to receive a tube 20 of the moving system. To this end, stylus assembly housing 22 is provided with flanges to engage the side of the cartridge body and thereby insure the proper alignment of the stylus assembly with the components contained within the cartridge.

Figure 2:
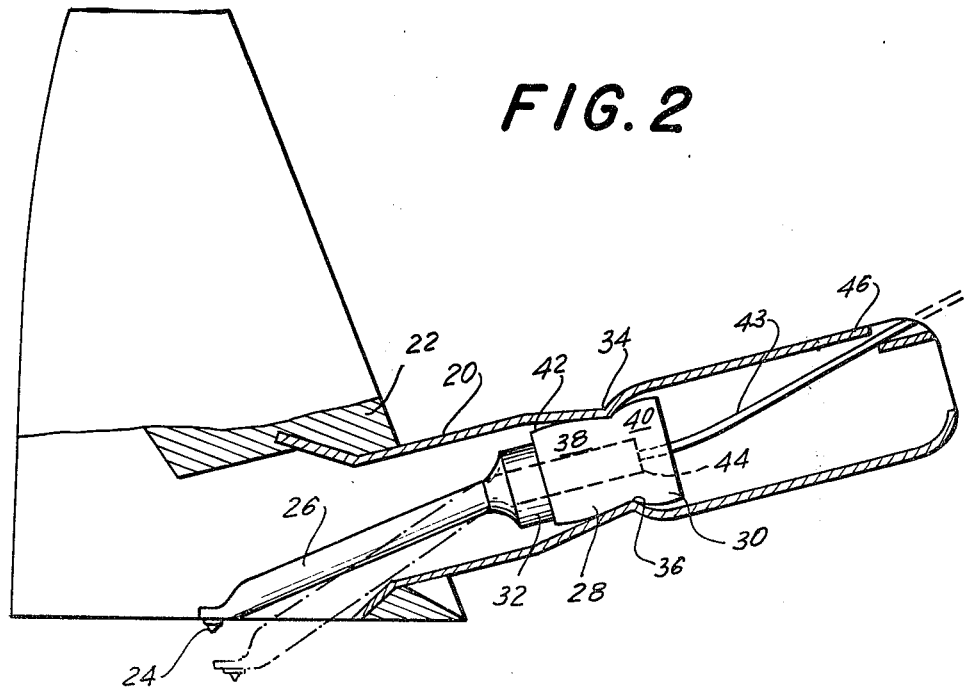
FIG. 2 is an enlarged, fragmentary side elevational sectional view of the cartridge stylus assembly.

As shown in FIG. 2, tube 20 is secured to the stylus assembly housing 22 and extends rearwardly outwardly therefrom. Tube 20 is formed of a non-magnetic material, such as aluminum or brass, and serves to contain therein a magnetic member which oscillates within the magnetic circuits of the cartridge in response to variations in the groove of a record disc. To this end, the stylus assembly includes a jeweled stylus 24 designed to ride in and track the grooves of a record. Jewel 24 is mounted to the forward end of a non-magnetic stylus arm 26 which extends from the jewel into tube 20 as shown. The rear end 28 of the stylus arm is supported within an elastomeric grommet 30 to permit generally universal movement. The grommet is formed of butyl rubber or the rubber-like compounds which yield sufficiently to permit substantially free movement of the arm.

In addition to serving as a universal joint for the stylus arm, grommet 30 provides a mechanical damper for the stylus arm. It is desirable that the mechanical impedance of the damper be as low as possible so that the magnetic member 32 which is mounted to arm 26 and moves therewith will accurately follow the movement of the stylus. In a successful practice of this invention, magnetic member 32 comprised a samarium cobalt permanent magnet.

In accordance with the present invention, low mechanical impedance of grommet 30 is attained by having the damper engage tube 20 only along a single line formed by a crimp 34 defined in the tube wall. The crimp, in effect, produces a knife edge 36 which engages the grommet at a point intermediate its ends. The portion of the grommet 38 in front of knife edge 36 as well as the portion 40 rearward of knife edge 36 are both free of the tube. It is an important feature of the present invention that the portion 38 of the grommet in front of knife edge 36 does not engage the wall 42 of tube 20.

In order to restore the stylus to its zero position after it has been displaced in following a record groove, a tie wire 43 is provided. Tie wire 43 extends rearwardly from the rear end 44 of arm 28. The tie wire 43 is secured to the rear end 46 of tube 20. In assembling the stylus assembly, care is taken so that the tie wire is tension-free and care must be taken in assembling the stylus assembly to ensure that this is attained.

As stated, the tie wire serves to restore the stylus to its zero position after displacement. By maintaining the tie wire substantially tension-free, its restoring properties are not effected by the frequency at which the stylus is tracking a record groove at any particular moment. In addition, by maintaining the tie wire substantially tension-free, the tie wire does not tend to compress the damping grommet 30 and hence the grommet's damping qualities are a function of its elastomeric properties and independent of the tie wire's restoring force. Thus, in accordance with the present invention, the aforementioned objective of isolating the mechanical parameters for compliance and damping is attained. Damping is solely a function of the grommet and is completely independent of the tie wire. Similarly, compliance is solely a function of the tie wire and is independent of the grommet. In this manner, the record tracking characteristics of the stylus assembly are vastly improved.

It should be emphasized that while the above description relates to a moving magnet stylus assembly (i.e., magnetic member 32 in the preferred embodiment is a permanent magnet), the present construction would apply equally to a moving iron stylus or moving coil. In the latter case, the magnetic member would comprise a permeable material and a suitable permanent magnet would have to be provided either in the stylus housing or cartridge assembly to magnetize the magnetic member.

Thus, in accordance with the above, the aforementioned objects are effectively attained.

Having thus described the invention, what is claimed is:

1. In a phonograph cartridge stylus assembly of the type comprising: a housing; a non-magnetic tube affixed to said housing, said tube having a forward end and a rearward end; a non-magnetic arm positioned within said tube, said arm having a forward portion extending through said tube forward end and a rearward portion; a stylus tip secured to said arm forward portion; a magnetic member mounted to said arm for movement therewith; and an elastomeric damper within said tube securing said arm rearward portion, said damper comprising a member positioned about said arm rearward portion: the improvement comprising a crimp in said tube wall defining a knife edge engaging said member intermediate the ends thereof, said damper being free of said tube wall except at said crimp; and further comprising a tension-free tie wire extending rearwardly from said arm rearward portion to the tube rearward end.

2. The stylus in accordance with claim 1 wherein said magnetic member is disposed immediately in front of said damper.

3. The stylus in accordance with claim 2 wherein said magnetic member comprises a permanent magnet.

4. The stylus in accordance with claim 1 wherein said damper member and said tube is cylindrical.

5. The stylus in accordance with claim 1 wherein said arm extends beyond the magnetic member terminating within the elastomeric damper in front of said crimp.

* * * * *